(12) United States Patent
Kamath et al.

(10) Patent No.: US 10,422,386 B2
(45) Date of Patent: Sep. 24, 2019

(54) BEARING LOCK, BEARING ASSEMBLY AND ASSOCIATED METHOD

(71) Applicant: Regal Beloit America, Inc., Beloit, WI (US)

(72) Inventors: Anil Venkatray Kamath, Maharashtra (IN); Pravin Jadhav, Maharashtra (IN)

(73) Assignee: Regal Beloit America, Inc., Beloit, WI (US)

( * ) Notice: Subject to any disclaimer, the term of this patent is extended or adjusted under 35 U.S.C. 154(b) by 466 days.

(21) Appl. No.: 15/202,612

(22) Filed: Jul. 6, 2016

(65) Prior Publication Data

US 2018/0010643 A1 Jan. 11, 2018

(51) Int. Cl.

| F16C 33/58 | (2006.01) |
| F16C 35/073 | (2006.01) |
| F16C 33/00 | (2006.01) |
| F16C 33/78 | (2006.01) |
| F16C 35/04 | (2006.01) |
| F16C 25/08 | (2006.01) |

(52) U.S. Cl.
CPC ............ *F16C 35/073* (2013.01); *F16C 25/08* (2013.01); *F16C 33/00* (2013.01); *F16C 33/581* (2013.01); *F16C 33/7806* (2013.01); *F16C 35/045* (2013.01); *F16C 2226/60* (2013.01)

(58) Field of Classification Search
CPC ...... F16C 35/073; F16C 33/581; F16C 25/08; F16C 33/7806; F16C 35/045; F16C 2226/60
See application file for complete search history.

(56) References Cited

U.S. PATENT DOCUMENTS

| 738,445 A | 9/1903 | Hoffmann |
| 3,033,597 A | 5/1962 | Miller |
| 3,957,319 A * | 5/1976 | Gorski .................. F16C 23/086 384/556 |
| 5,011,306 A | 4/1991 | Martinie |
| 5,373,636 A | 12/1994 | Martinie |
| 5,529,403 A | 6/1996 | Martinie |
| 5,709,483 A | 1/1998 | Martinie |

\* cited by examiner

*Primary Examiner* — Rick K Chang
(74) *Attorney, Agent, or Firm* — Regal Beloit America, Inc.; John S. Wagley

(57) ABSTRACT

A lock for use with an assembly is provided. The assembly includes an inner race having a bore with a generally tapered periphery. The bearing assembly supports a shaft. The bearing lock includes a sleeve having a generally cylindrical internal periphery adapted for cooperation with the shaft and a generally tapered external periphery that cooperates with the bore. The sleeve conforms from a first condition whereby the internal periphery defines a first diameter to a second condition whereby the internal periphery defines a second diameter different than the first. The bearing lock also includes a collar that cooperates with the sleeve to urge the sleeve from the first condition to the second condition. The collar conforms from a first condition whereby the generally cylindrical internal periphery defines a first diameter to a second condition whereby the internal periphery defines a second diameter substantially different than the first.

20 Claims, 10 Drawing Sheets

BEARING LOCK, BEARING ASSEMBLY AND ASSOCIATED METHOD

BACKGROUND OF THE INVENTION

The embodiments described herein relate generally to bearing assemblies, and more specifically, to bearing assemblies with a mechanism for mounting or locking the bearing assembly to a shaft.

Bearing assemblies are utilized to permit the relative motion of one component or assembly with respect to another component or assembly. The bearing assembly typically has a first component, for example an inner ring, that is fixed to a first component and a second component, for example an outer ring that is fixed to a second component. The first component is permitted to have relative motion, typically to rotate, relative to the second component.

Alternatively, a widely used configuration to permit rotation between the components is in the form of a set of rolling elements that are positioned between the cylindrical surface of one component and the cylindrical surface of the second component. The rolling element may be balls, needles, cylinders or cylinders with spherical outer peripheries, also known as spherical rollers. A single row of rolling elements may be used or two or more rows may be used in a spaced apart configuration. The rolling elements may be placed in adjoining relationship on the outer periphery of the inner element and on the inner periphery of the outer element. Alternatively the rolling elements may be positioned in a spaced apart relationship, separated from each other by a separator in the form of a retainer or cage. The rolling elements and the inner element, ring or race and the outer element, ring or race form a rolling element bearing.

Many bearing assembly application provide for the rotation of the inner element which is secured to a shaft while the outer element is secured to a housing. Typically the inner element rotates, but many applications provide for the outer element rotating and the inner element stationary.

Often the bearing assembly is mounted in a housing and the inner element is secured to a shaft. The housing may be in the form of a housing with a mounting arrangement for mounting to a surface with fasteners. Such a housing may be in the form of a flange housing, a hanger housing, a take-up housing or a surface mount housing, also known as a pillow block.

For many bearing applications, the loads on the bearing assembly are steady and radial through the inner element and the outer element. For such bearing applications, the fit of the outer element to the housing is not critical and may be in clearance. Also for such bearing applications, the fit of the inner element to the shaft is not critical and a simple collar with a locking screw with a point to contact the shaft or a keyway in the shaft and on the collar for fitting with a key may be sufficient to secure the inner element to the shaft.

In a number of applications the loads on the bearing assembly are not steady making the securement of the shaft to the inner element of the bearing very important. The applications include those with eccentric loading such as construction, impaction and vibratory equipment including shakers and vibratory conveyors. In such applications, the typical shaft to inner element securing means are not adequate. Such typical securing means include a simple collar with a locking screw with a point to contact the shaft or a keyway in the shaft and on the collar for fitting with a key.

Methods to provide a more secure locking of the inner element to the shaft have included an eccentric collar fitted to the shaft and inner element and a split collar that is squeezed onto the shaft and/or the inner element. Heavier press or shrink fit of the inner element onto the shaft may provide for improved securing of the beaming to the shaft. While these methods have provided mixed results in securing the shaft to the bearing, removal of the shaft from the bearing may be problematic as the shaft/inner element interface may have fretting corrosion making disassembly problematic.

The present invention is directed to alleviate at least some of these problems with the prior art.

BRIEF DESCRIPTION OF THE INVENTION

According to an aspect of the invention, a bearing lock for use with a bearing assembly is provided. The assembly includes an inner race having a bore with a generally tapered periphery. The bearing assembly supports a shaft. The bearing lock includes a sleeve having a generally cylindrical internal periphery adapted for cooperation with the shaft and a generally tapered external periphery that cooperates with the bore. The sleeve conforms from a first condition whereby the internal periphery defines a first diameter to a second condition whereby the internal periphery defines a second diameter different than the first. The bearing lock also includes a collar that cooperates with the sleeve to urge the sleeve from the first condition to the second condition. The collar conforms from a first condition whereby the generally cylindrical internal periphery defines a first diameter to a second condition whereby the internal periphery defines a second diameter substantially different than the first.

According to another aspect of the invention, the bearing lock may be provided such that at least a portion of the internal periphery of the collar defines internal threads and such that at least a portion of the external periphery of the sleeve defines external threads. The external threads of the sleeve mate with the internal threads of the collar.

According to another aspect of the invention, the bearing lock may be provided such that the sleeve defines a longitudinal slit extending from the internal periphery of the sleeve to the external periphery of the sleeve. The longitudinal slit further extends from a first end of the sleeve to an opposed second end of the sleeve.

According to another aspect of the invention, the bearing lock may be provided such that the sleeve defines a plurality of spaced apart longitudinally extending slits extending from the internal periphery of the sleeve to the external periphery of the sleeve. To provide a unitary sleeve, the sleeve, when used with multiple slits, preferably, extend only partially along the length of the sleeve. For example the slits may extend from the first end of the sleeve to a position spaced from the second end of the sleeve. For example alternate slits may extend from alternate ends of the sleeve or, alternately, all slits may extend from one end or any other pattern.

According to another aspect of the invention, the bearing lock may be provided such that the inner race has a bore having at least a portion thereof having a generally tapered shape and such that the sleeve has an external periphery having at least a portion thereof having a generally tapered shape. The tapered portion of the bore of the inner race mates with the tapered portion of the external periphery of the sleeve.

According to another aspect of the invention, the bearing lock may be provided such that the inner race includes an external periphery defining a race portion adapted for cooperation with rolling elements and opposed sealing portions axially spaced from the race portion.

According to another aspect of the invention, the bearing lock may be provided such that the collar defines a slit extending from a first end of the collar to an opposed second end of the collar.

According to another aspect of the invention, the bearing lock may be provided such that the collar defines a first threaded opening and a second opening. The bearing lock further includes a fastener for cooperation with the first and second openings and is adapted to urge the collar toward the sleeve.

According to another aspect of the invention, the bearing lock may be provided such that the collar defines a slit extending from a first end of the collar to an opposed second end of the collar, such that a first external face of the collar and a second external face of the collar defines a slit between the first external face of the collar and the second external face of the collar, such that the slit extends from a first end of the collar to an opposed second end of the collar, such that the first threaded opening extends inwardly from the first external face, such that the second opening extends inwardly from the second external face, and such that the fastener is adapted to urge the first external face against the second external face.

According to another aspect of the invention, the bearing lock may further include a member for axially restraining the collar with respect to the inner race.

According to another aspect of the invention, the bearing lock may be provided such that the collar defines a first groove for receiving a portion of the member and such that the inner race defines a second groove for receiving a portion of the member.

According to another aspect of the invention, the bearing lock may be provided such that the first portion of the external periphery of the sleeve defines external threads extending toward a first end face of the sleeve, such that a second portion of the external periphery of the sleeve defines a surface tapered inwardly toward a second end face of the sleeve, opposed to the first end face of the sleeve, and such that a third portion of the external periphery of the sleeve is positioned between the first portion of the external periphery of the sleeve and the second portion of the external periphery of the sleeve. The third portion is recessed with respect to the first portion and to the second portion.

According to another embodiment of the invention, a bearing assembly for supporting a shaft may be provided. The bearing assembly includes a rolling element bearing including an inner race having a bore with a generally tapered periphery. The bearing assembly is adapted for supporting the shaft.

The bearing assembly also includes a sleeve having a generally cylindrical internal periphery adapted for cooperation with the shaft and a generally tapered external periphery adapted for cooperation with the bore of the inner race. The bearing assembly also includes a collar adapted for cooperation with the sleeve for urging the sleeve against the shaft.

The collar defines an interior periphery thereof. The collar is adapted to being conformed from a first condition in which the generally cylindrical internal periphery defines a first diameter to a second condition in which the generally cylindrical internal periphery defines a second diameter that is substantially different from the first diameter.

According to another aspect of the invention, the bearing assembly may be provided such that the sleeve defines a longitudinal slit extending from the internal periphery of the sleeve to the external periphery of the sleeve. The longitudinal slit further extends from a first end of the sleeve to an opposed second end of the sleeve.

According to another aspect of the invention, a method for securing a shaft to a bearing is provided. The method includes the step of providing a bearing including an inner ring having a tapered bore and the step of providing a sleeve having an internal periphery adapted for cooperation with the shaft and an external periphery adapted for cooperation with the bore of the inner ring. The method also includes the step of urging the sleeve against the shaft and the inner ring, the step of providing a collar adapted for cooperation with the inner ring, and the step of urging the collar against at the shaft or the inner ring, or both.

According to another aspect of the invention, the method may be provided such that the step of urging the sleeve against the shaft is preformed prior to the step of urging the collar against the shaft.

According to another aspect of the invention, the method may be provided such that the step of providing a bearing including an inner ring having a bore includes providing a bearing including an inner ring having a bore with a generally tapered periphery and such that the step of providing a sleeve having an internal periphery adapted for cooperation with the shaft and an external periphery adapted for cooperation with the bore of said inner ring includes providing a sleeve having a generally cylindrical internal periphery adapted for cooperation with the shaft and a generally tapered external periphery adapted for cooperation with the bore of said inner ring.

According to another aspect of the invention, the method may be provided such that the step of urging the collar against at least one of the shaft and the inner ring includes moving the collar relative to the sleeve to urge said sleeve against the shaft.

According to another aspect of the invention, the method may be provided such that the step of providing the collar includes providing the collar with internal threads, such that the step of providing the sleeve includes providing the sleeve with external threads that mate with the internal threads of said collar and such that the step of moving the collar relative to the sleeve includes rotating the collar relative to the sleeve to urge the sleeve axially with respect to the inner ring.

According to another aspect of the invention, the method may be provided such that the step of moving the collar relative to the sleeve to urge said sleeve against the shaft includes providing the collar with a radial slit therethrough and collapsing the collar at the slit.

DETAILED DESCRIPTION OF THE INVENTION

The method, systems and apparatus described herein facilitate the securing of a bearing onto a shaft.

The methods, systems, and apparatus described herein assist in secure locking of a bearing inner element or ring to a shaft. The methods, systems, and apparatus described herein may also facilitate the easy removal of the bearing ring from the shaft. Furthermore, the methods, systems, and apparatus described herein provide for an improved appearance of the bearing and its appeal to the customer.

Technical effects of the methods, systems, and apparatus described herein include at least one of improved performance and quality and reduced labor costs.

Figure 1:
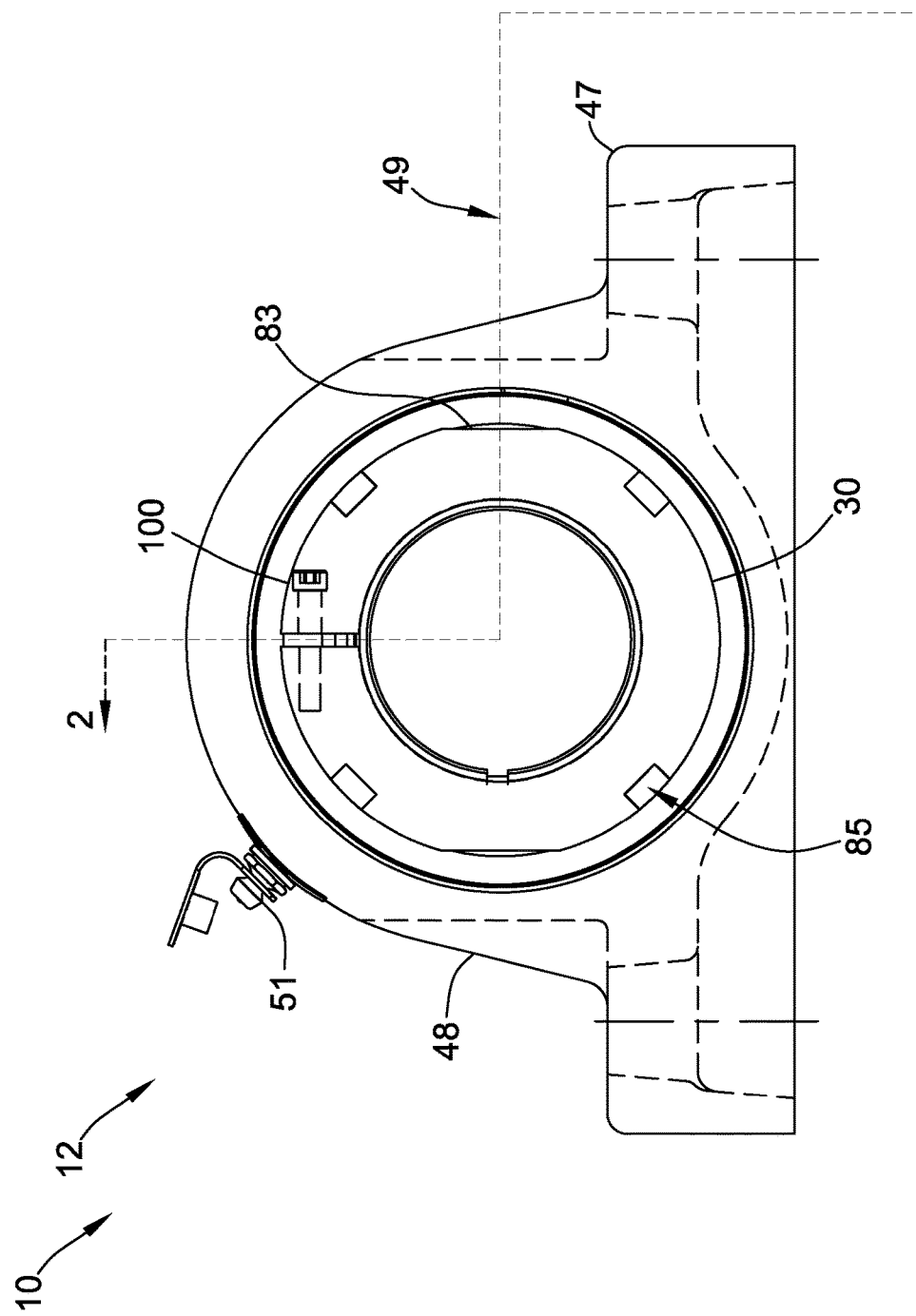
FIG. 1 is a plan view of an embodiment of the present invention in the form of a bearing assembly.
Figure 2:
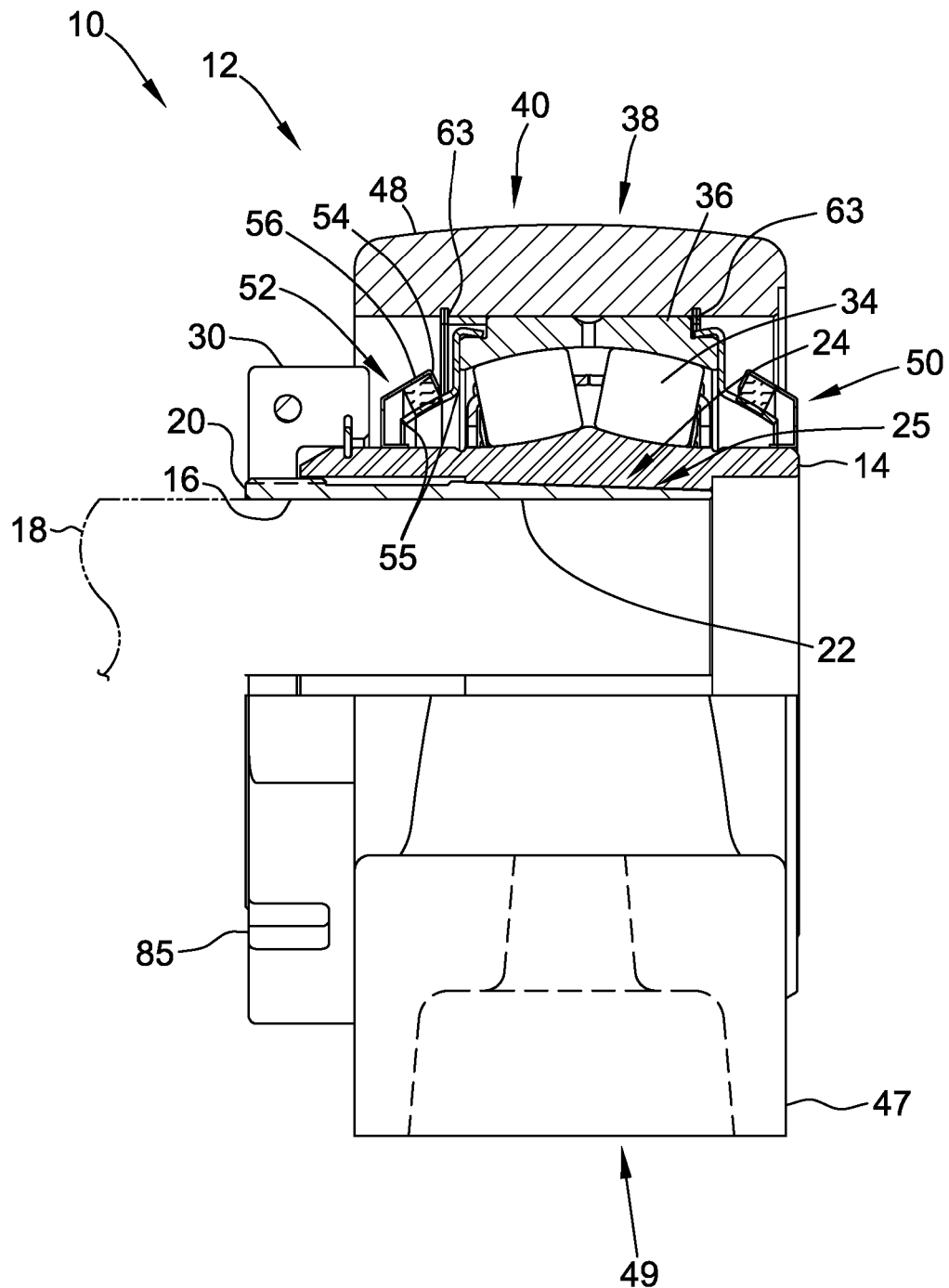
FIG. 2 is a cross sectional view of FIG. 1 along the line 2-2 in the direction of the arrows.

Referring now to FIGS. 1 and 2 and according to an aspect of the invention, a locking device or bearing lock 10 for use with a bearing assembly 12 is provided. The bearing assembly 12 includes an inner element, inner ring or inner race 14 having a bore or inner periphery 16 that is generally tapered. The bearing assembly 12 is adapted for supporting a shaft 18. The bearing lock 10 also includes a sleeve 20 having a generally cylindrical internal periphery 22 adapted for cooperation with the shaft 18 and an external periphery 24 having a first or tapered portion 25 adapted for cooperation with the bore 16 of the inner race 14.

Figure 3:
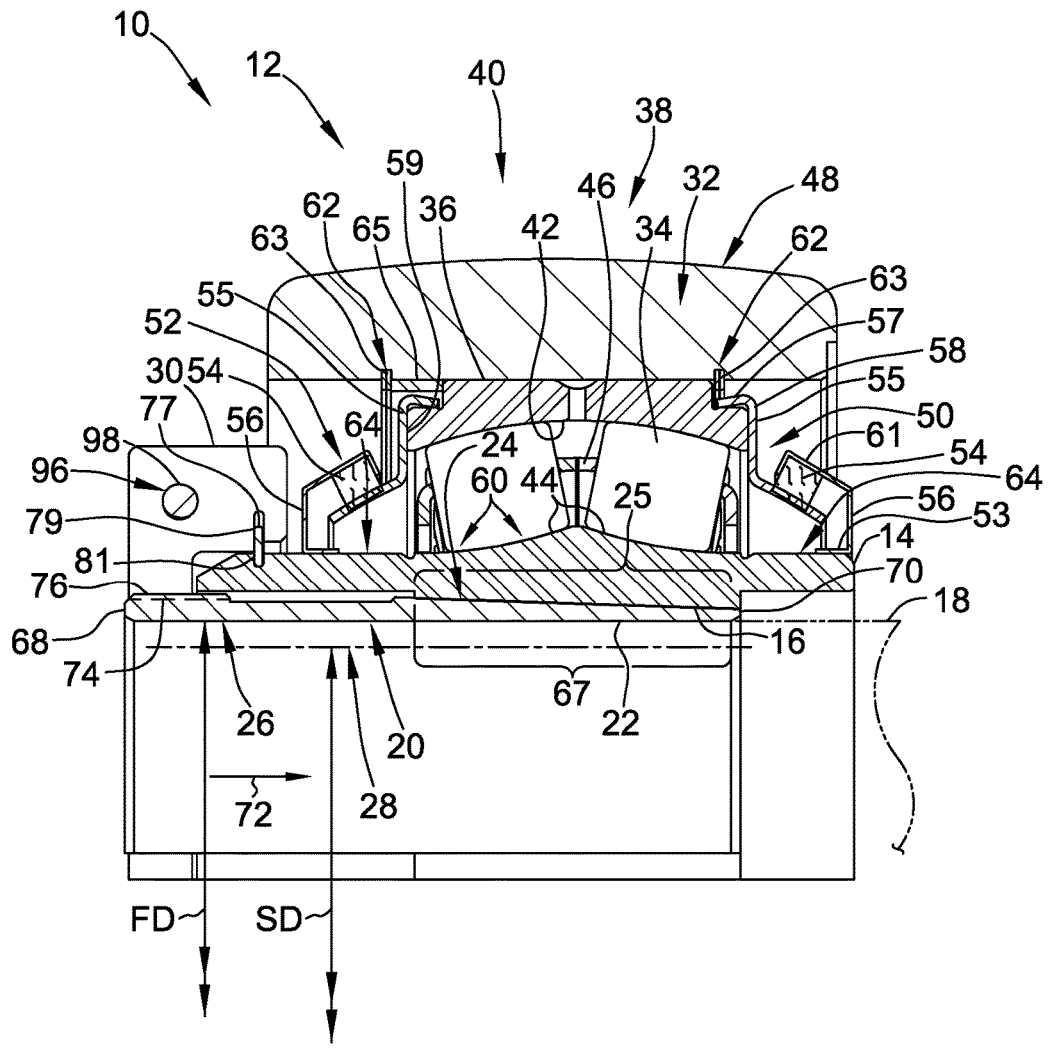
FIG. 3 is a partial cross sectional view of FIG. 2.

Referring now to FIG. 3, the sleeve 20 is adapted to conform from a first condition 26, as shown in solid, in which the generally cylindrical internal periphery 22 defines a first diameter FD to a second condition 28, as shown in phantom, in which the generally cylindrical internal periphery 22 defines a second diameter SD that is substantially different from the first diameter FD. The bearing lock 10 also includes a collar 30 adapted for cooperation with the sleeve 20 for urging the sleeve 20 from the first condition 26 to the second condition 28.

As shown in FIGS. 1-3 the bearing assembly 12 typically includes a bearing 32. The bearing 32 is typically a rolling element bearing, for example a ball bearing, a cylindrical roller bearing, a needle roller bearing, or a spherical roller bearing. The bearing 32 may have a single row of rolling elements or may have multiple rows of bearings. The rolling elements may be a full complement of elements, with the elements closely packed in adjoining relation to each other or may be separated and guided by a retainer.

For example and as shown in FIGS. 1-3 the bearing 32 includes rolling elements, for example and as shown, in the form of spherical rollers 34. It should be appreciated that the rolling elements may alternatively be spherical balls, cylindrical rollers, needle rollers, or spherical rollers.

The bearing 32 typically includes an outer element, outer ring or outer race 36. As shown the bearing 32 also includes the spherical rollers 34. While the bearing 32 may have a single row of rollers 34, as shown the bearing 32 has an inner row 38 and an outer row 40 of rollers 34.

The rollers 34 are in rolling contact with outer race contact surface 42 of the outer race 36 and with inner race contact surfaces 44 of the inner race 14. As shown the rollers are guided by retainer or separator 46 that separates and guides the rollers 34.

The inner race 16, the outer race 36 and the rollers 34 are made of any suitable durable material and may for example be made of a through hardened or case hardened alloy steel.

The retainer 46 may be made of any suitable material and may, for example, be made of a metal stamping, a machined metal component or be molded from a polymer.

As shown in FIG. 1, the bearing 32 may be utilized in any device and may be mounted to, for example, a housing 48. The housing 48 may be a component of the device or may, as shown, be in the form a bearing housing 48, for example, a pillow block 48. The pillow block 48 may include feet 47 having openings 49 for receiving fasteners (not shown) for securing the housing 48 to a surface (not shown).

Referring again to FIG. 3, the bearing 32 may include seals for containing lubricant in the form of for example oil or grease and for keeping contamination from the rollers 34. As shown, an inner seal 50 and an outer seal 52 may be mounted to outer race 36 and may include sealing elements 54 which engage the inner race 14. The housing 48 may include a zerk or grease fitting 51 (see FIG. 1) for adding grease to the bearing assembly 12.

The seals 50 and 52 may be any suitable seal and may be labyrinth seals including washers that provide pathways that are filled with grease (not shown). The seals 50 and 52, as shown, are lip or contact seals which include the sealing elements 54 located on one of rotating or non-rotating bearing portions which contact the other of the rotating or non-rotating portion of the bearing assembly 12. The sealing elements 54 may be made of any suitable material and may be made of a metal, a polymer or, as shown, be made of felt.

As shown, the seals 50 and 52 may include a first stationary member or contact portion 55 that is used to provide a contact surface for the sealing element 54 and a second rotating member or seal mounting portion 56 or that is used to mount the sealing element 54. The contact portion 55 is, as shown, mounted to the outer race 36. The contact portion 55 may be made of any suitable material, such as a metal or a polymer. As shown, the contact portion 55 is made of a metal and stamped into its shape. The contact portion 55 may, as shown, include a curled over portion or lip 57 and the lip 57 is secured to a recess or inwardly tapered shoulder 58 formed in the outer race 36. The contact portion 55 includes a contact surface 59 at a position opposed to the lip 57.

The seal mounting portion 56 may be made of any suitable material, such as a metal or a polymer. As shown, the seal mounting portion 56 is made of a metal and stamped into its shape. The seal mounting portion 56, as shown, includes a mounting portion 53 that is secured to inner race 14 and a seal pocket 61 opposed to the mounting portion 53 to which the felt seal element 54 is secured. The seal mounting portion 56 is positioned axially along the inner race 14 such that the felt seal element 54 engages the contact surface 59 of the contact portion 55.

Grooves 62 formed in the housing 48 may be used to receive rings 63. The grooves 62 are positioned axially on in the housing 48 to permit the bearing outer race 36 to axially float between the rings 63 to prevent axial loading on the bearing assembly 12. The rings 63, along with a spacer 65, may be used to axially position the outer race 36 relative to the housing 48. For mounting arrangements with two bearing assemblies 12, the spacer 65 may be used on one of the two bearing assemblies 12 to provide an axially fixed or non-expansion bearing while the other bearing assembly will not use the spacer 65 so that the other bearing assembly may axially float. The rings 63 may be snap rings and may be made of metal.

As shown in FIG. 3 and according to an aspect of the invention, the bearing lock 10 may be provided such that the bore 16 of the inner race 14 has a first or tapered portion 67 that has a generally tapered shape. Further, the external periphery 24 of the sleeve 20 may include the first or tapered portion 25 of the sleeve external periphery 24 that has a generally tapered shape. The tapered portion 67 of the bore 16 of the inner race 14 mates with the tapered portion 25 of the external periphery 24 of the sleeve 20.

As shown in FIG. 3 and according to another aspect of the invention, the bearing lock 10 may be provided such that the inner race 14 includes an external periphery 60 defining the inner race roller contact surfaces 44 adapted for cooperation with rolling elements or rollers 34 and opposed seal contact securing surface 64 axially spaced from the race surfaces 44. The race surfaces 44, as shown, accommodate both the inner row 38 of rollers 34 and the outer row 40 of rollers 34. The opposed seal contact securing surfaces 64 provide mount features for the contact portions 56 that cooperate with the sealing element 54 of the inner seal 50 and with the sealing element 54 of the outer seal 52, respectively.

The sleeve 20 is adapted to conform from first condition 26, as shown in solid, in which the generally cylindrical internal periphery 22 defines first diameter FD to second condition 28, as shown in phantom, in which the generally cylindrical internal periphery 22 defines second diameter SD that is substantially different from the first diameter FD. The bearing assembly 12 may be removed from the shaft 18 or vice versa when the sleeve 20 is in first condition 26, as shown in solid. The bearing assembly 12 may be rigidly secured to the shaft 18 when the sleeve 20 is in second condition 28, as shown in phantom.

Figure 4:
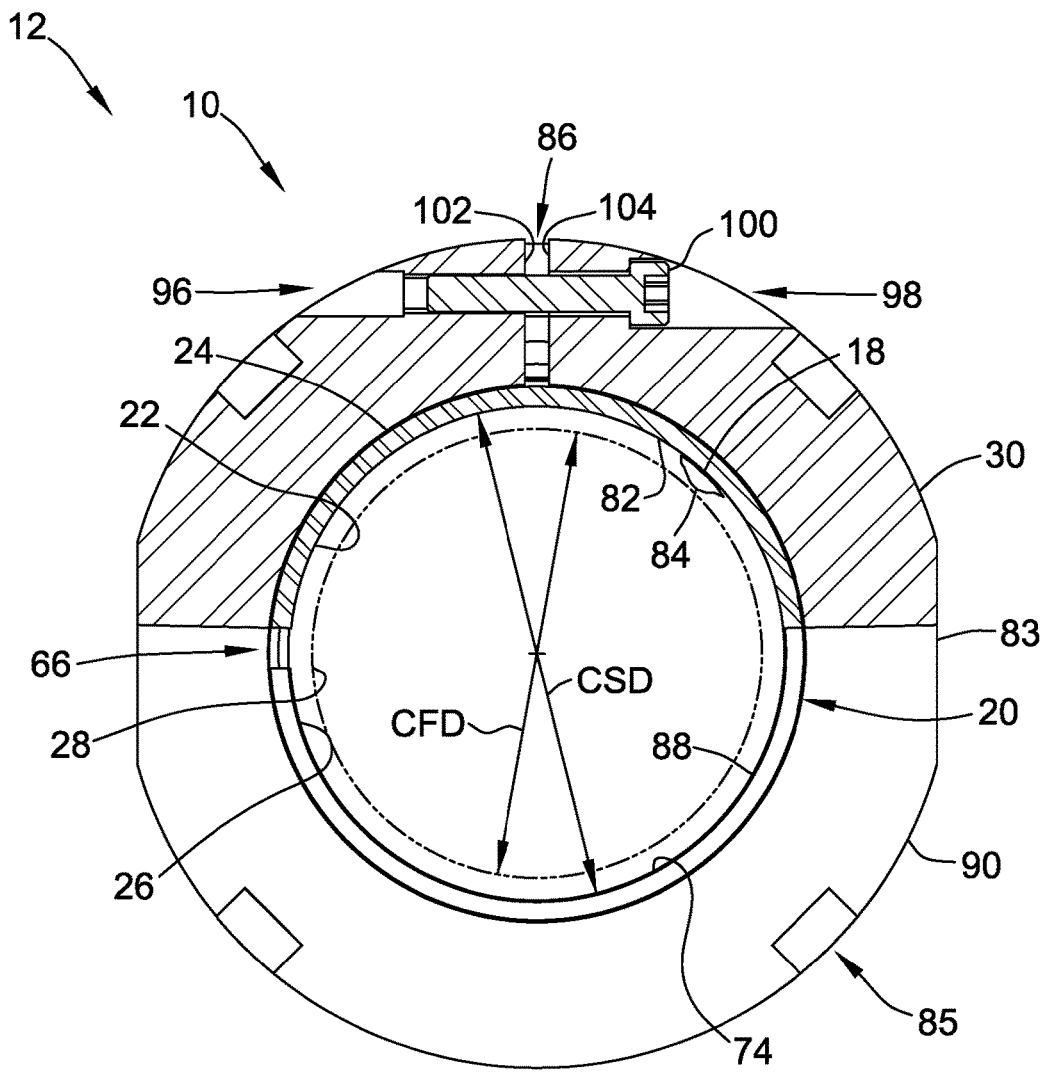
FIG. 4 is an end view of FIG. 5, shown a portion thereof cut away.

Referring now to FIG. 4, the sleeve 20 may conform for the first condition 26 to the second condition 28 in any suitable manner. Typically the cylindrical internal periphery 22 of sleeve 20 must contract. While the sleeve 20 may be made of any suitable durable material, because of the duty cycle and loads imposed on the bearing 32, the sleeve is made of a metal, for example an alloy steel. To provide sufficient flexure to the sleeve 20, the sleeve 20 typically has at least one longitudinal void 66 to permit its flexure. It should be appreciated that the void may be in the form of a slit or a plurality of spaced apart slits. The slit(s) may extend from an end of the sleeve and through the sleeve 20 from the internal periphery 22 to the external periphery 24, such that the tapered portion 25 of the sleeve 20 includes the slits. Alternatively, the slits may partially extend from opposed ends of the sleeve 20.

According to another aspect of the invention, for simplicity and as shown in FIGS. 3-4, the sleeve 20 may include the axial void in the form of solitary longitudinally extending axial slit 66 extending axially from the internal periphery 22 of the sleeve 20 to the external periphery 24 of the sleeve 20. The longitudinal slit 66 further extends from a first end face 68 of the sleeve 20 to an opposed second end face 70 of the sleeve 20.

As shown in FIGS. 3-4, the collar 30 may be used to assist in urging the sleeve 20 from first condition 26 to second condition 28. The collar 30 may do so in any suitable manner.

For example and as shown in FIG. 3, the collar 30 may urge the sleeve 20 in the direction of arrow 72 such that the tapers of the inner race 14 and the sleeve 20 cooperate to urge the sleeve 20 from first condition 26 to second condition 28. To move the sleeve 20 in the direction of arrow 72, the collar 30 may have internal threads 74 which cooperate with external threads 76 on the sleeve 30. As the collar is rotated, the sleeve 20 moves in the direction of arrow 72 with respect to the inner race 14.

The sleeve 20 may be moved by the collar 30 in the direction of arrow 72 by any suitable mechanism. For example and according to another aspect of the invention, the bearing lock may further include a member 77 for axially restraining the collar 30 with respect to the inner race 14. Such a mechanism or member 77 keeps the axial position of the collar 30 with respect to the inner race 14 fixed, while the rotating of the collar 30 with respect to the sleeve 20 causes the sleeve 20 to move axially away from the collar 30. This motion causes the mating tapered portions 25 and 67 of the sleeve 20 and inner race 14, respectively to urge the sleeve 20 toward the shaft 18.

Any suitable mechanism may be used to axially restrain the collar 30 with respect to the inner race 14. For example and according to another aspect of the invention, The member 77 may be in the form of a snap ring or washer. The bearing lock 10 may be provided such that the collar 30 defines a first groove 79 for receiving a portion of the snap ring 77 and such that the inner race 14 defines a second groove 81 for receiving a portion of the snap ring 77.

The collar 30 may be rotated in any suitable fashion by any suitable tool. For example and as shown in FIG. 4, the collar 30 may include opposed flats 83 to which a wrench (not shown) may be attached. Alternatively, the collar 30 may include notches or holes 85 having any suitable shape which mate with prongs (not shown) on a spanner wrench (not shown).

Figure 5:
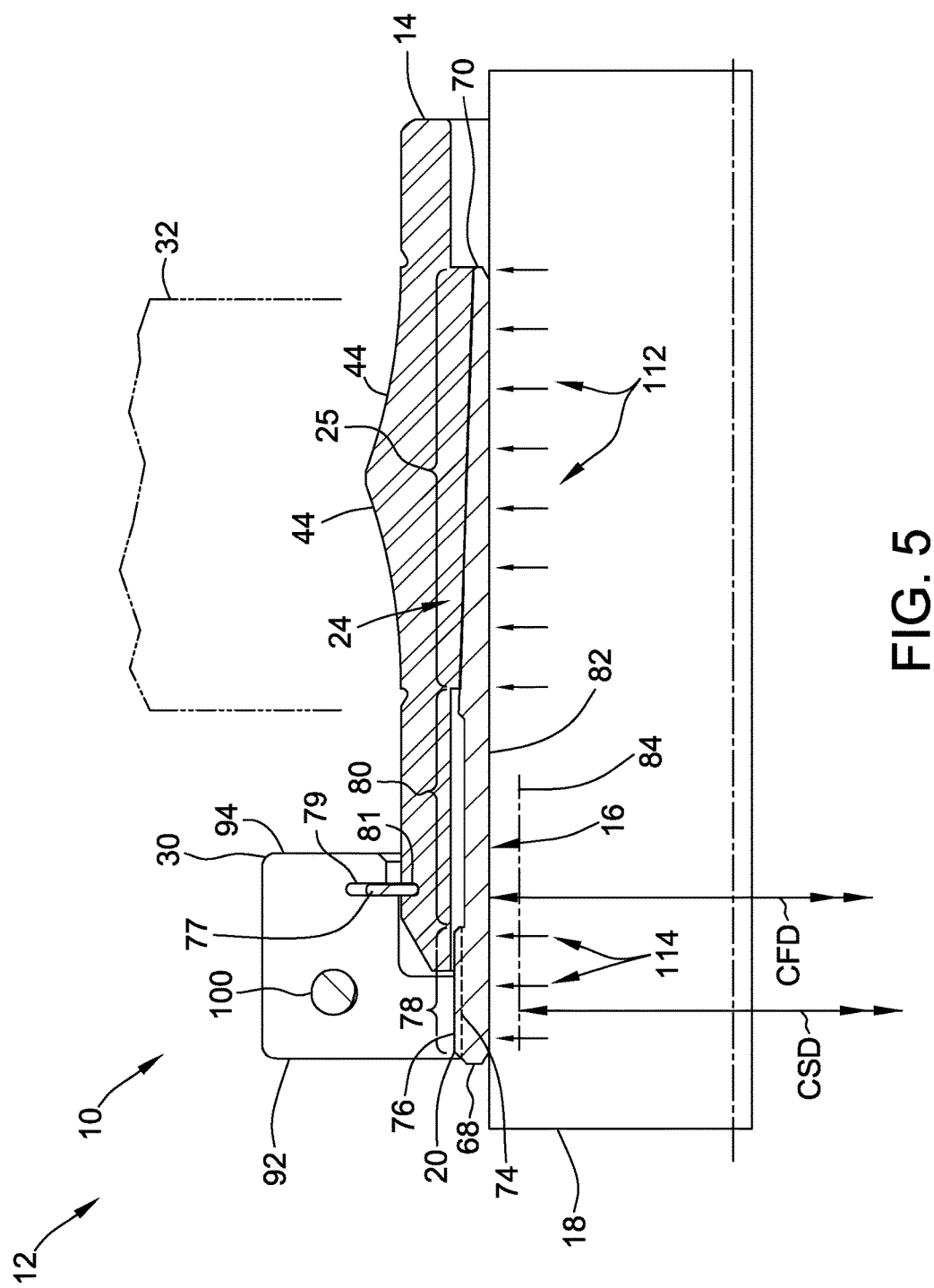
FIG. 5 is a partial cross sectional view of FIG. 3, showing the inner race, collar nut and sleeve in greater detail.

As shown in FIG. 5 and according to another aspect of the invention, the bearing lock 10 may be provided such that a second portion 78 of the external periphery 24 of the sleeve 20 defines the external threads 76 extending toward first end face 68 of the sleeve 20, such that the first portion 25 of the external periphery 24 of the sleeve 20 defines a surface tapered inwardly toward second end face 70 of the sleeve 20, opposed to the first end face 68 of the sleeve 20.

Further, the sleeve 20 may be configured to include a third portion 80 of the external periphery 24 of the sleeve 20 that may be positioned between the first portion 25 of the external periphery 24 of the sleeve 20 and the second portion 78 of the external periphery 24 of the sleeve 20. The third portion 80 may be recessed with respect to the first portion 25 and to the second portion 78.

While the tapered or first portion 25 of the external periphery 24 of the sleeve 20 may extend for most of the length of the sleeve 20, as shown in FIG. 5, the tapered or first portion 25 is positioned under the bearing 32. While the length of tapered portion 25 may be varied depending on the application, to provide adequate grip of the shaft 18, the length of the tapered portion may be extended.

Alternatively and as shown in FIGS. 4-5, the gripping of the shaft can be augmented by providing gripping of the shaft 18 by the collar 30.

Figure 6:
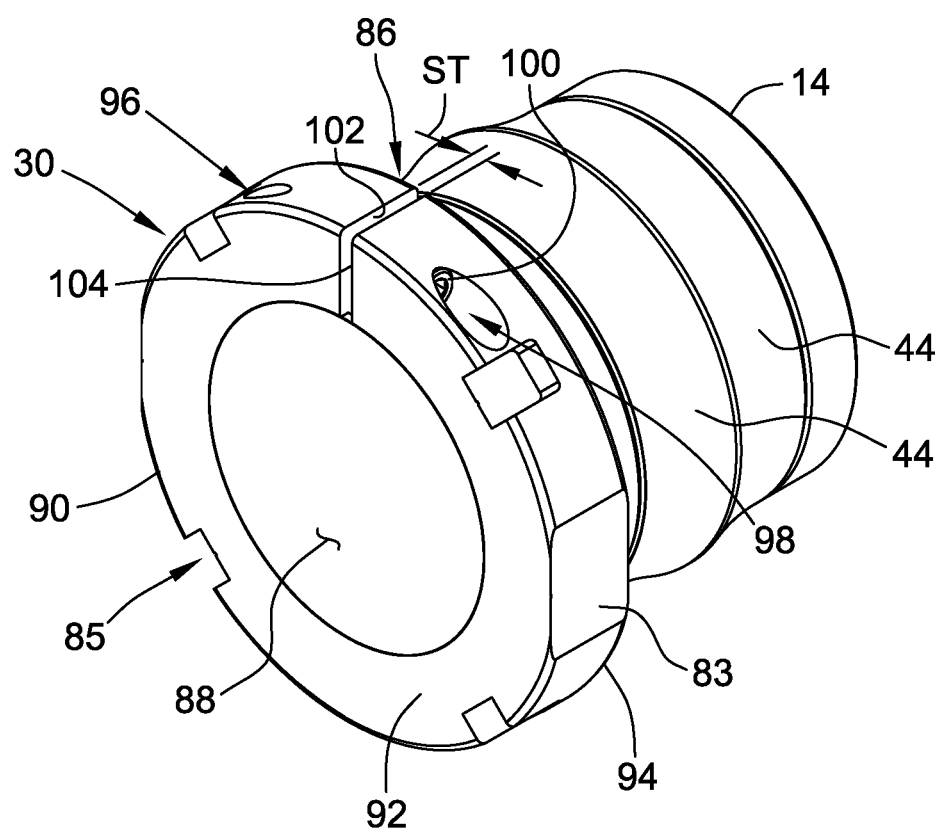
FIG. 6 is a perspective view of the inner race, sleeve and collar nut assembly of the bearing assembly of FIG. 1.

As shown in FIGS. 5-6 and according to another aspect of the invention, the bearing lock 10 may be provided such that the collar 30 defines an interior periphery of the collar 30 which as shown includes internal threads 74. The collar 30 is adapted to conform from a first condition 82 in which the generally cylindrical internal periphery defines a first diameter CFD to a second condition 84 in which the generally cylindrical internal periphery defines a second diameter CSD having substantially different than the first diameter CFD.

As shown in FIGS. 4-5, while the collar 30 may be made of any suitable durable material, because of the duty cycle and loads imposed on the bearing assembly 12, the collar 30 is made of a metal, for example an alloy steel. To provide sufficient flexure to the collar 30, the collar 30 typically has at least one void 86 to permit its flexure. It should be appreciated that the void 86 may be in the form of a slit that extends through the collar 30 from cylindrical internal periphery 88 to outer periphery 90. For example, bearing lock 10 may be provided such that the collar 30 defines slit 86 extending from a first end 92 of the collar to an opposed second end 94 of the collar.

The slit 86 permits the collar 30 to be collapsed onto the sleeve 20 so that the portion of the sleeve 20 over the collar 30 may engage the shaft 18 and further assist in securing the bearing assembly 12 to the shaft 18.

The collar 30 may be collapsed in any suitable manner. For example and as shown in FIG. 6, the bearing lock 10 may be provided such that the collar 30 defines a radially extending first threaded opening 96 and a second radially extending opening 98. The bearing lock may further include a fastener 100 for cooperation with the first and second openings 96 and 98. The slit 86 is located between first internal face 102 of collar 30 adjacent the first threaded opening 96 and second internal face 104 of collar 30 adjacent the second opening 98. As the fastener 100 is rotated, the fastener 100 draws the faces 102 and 104 of collar 30 together narrowing or reducing slit thickness ST.

Figure 7:
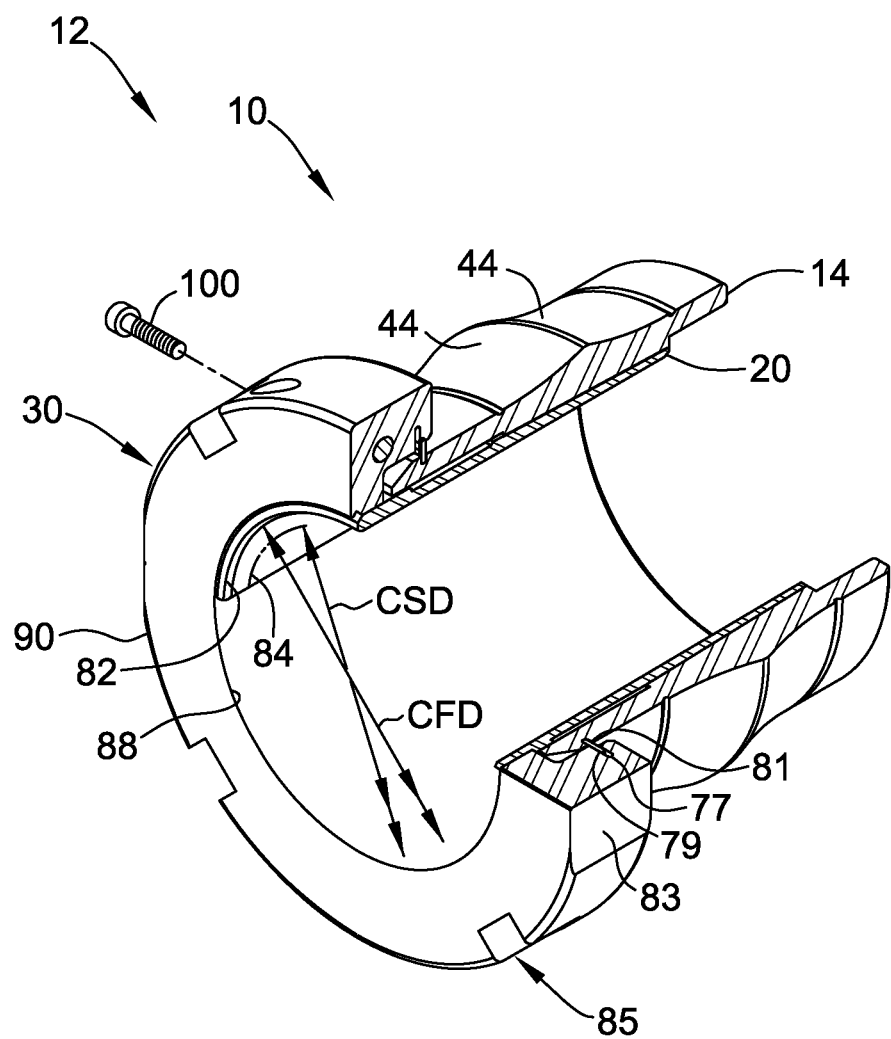
FIG. 7 is a perspective view of FIG. 6, shown a portion thereof cut away.
Figure 8:
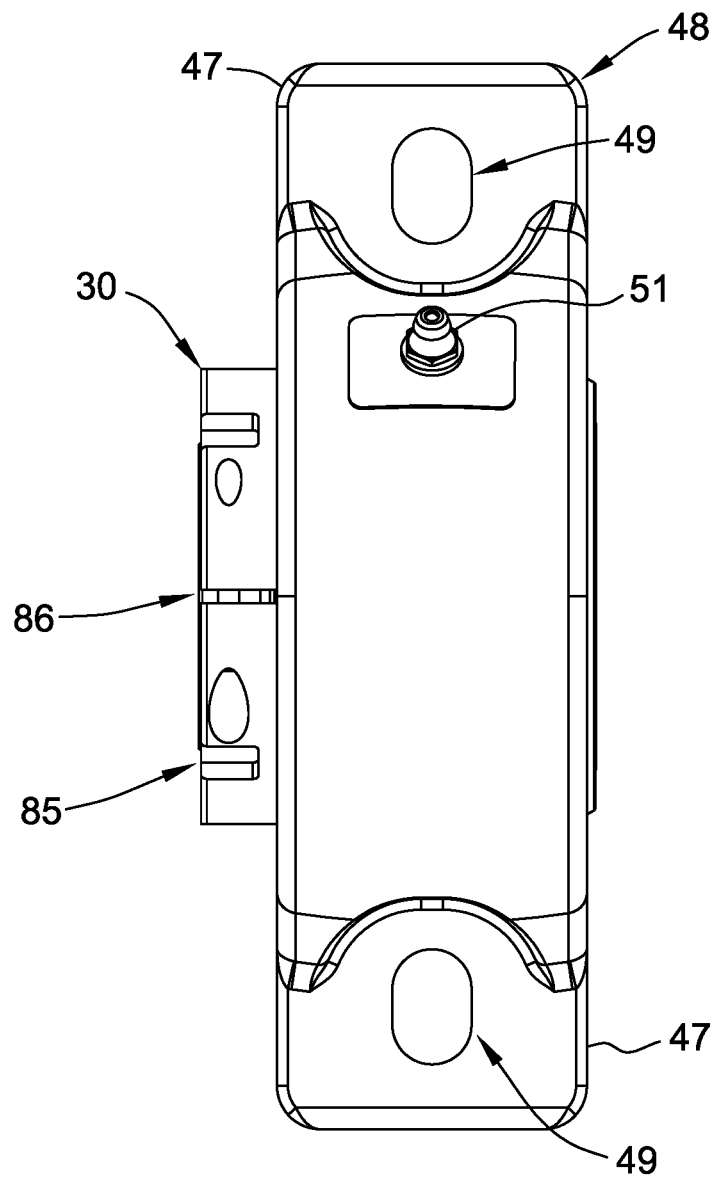
FIG. 8 is a top view of FIG. 1.

As shown in FIG. 7, this motion causes the collar 30 to conform from first condition 82 in which the generally cylindrical internal periphery 88 defines first diameter CFD to second condition 84 in which the generally cylindrical internal periphery defines second diameter CSD having a substantially different diameter than the first diameter CFD. This action urges the collar 30 toward the sleeve 20 and, consequently, urges the sleeve 20 toward the shaft 18.

Figure 9:
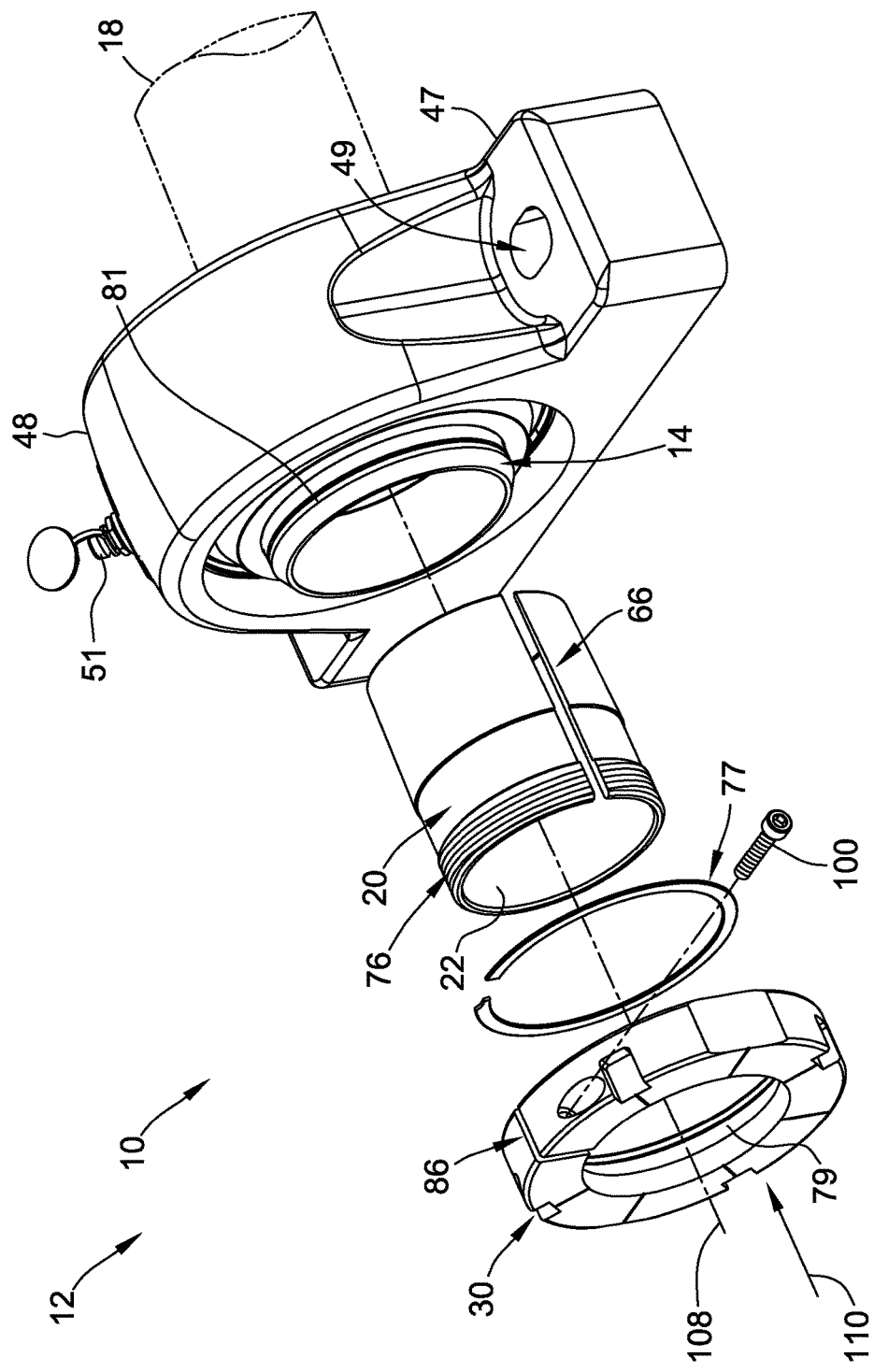
FIG. 9 is a perspective view of FIG. 1, showing the cap screw, snap ring, sleeve and collar nut in exploded fashion.
Figure 10:
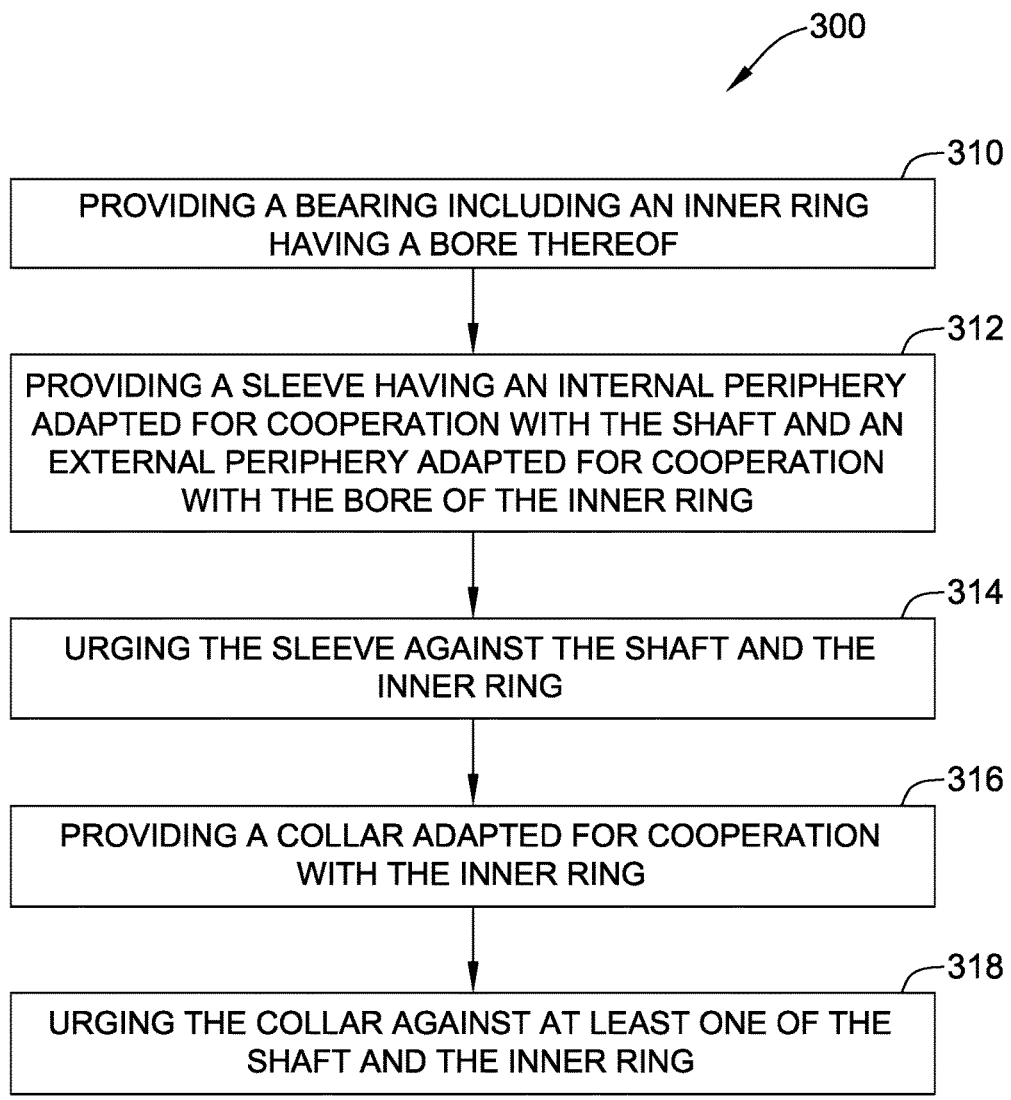
FIG. 10 is a schematic flow chart of a method for making a bearing assembly.

Referring now to FIG. 9, the bearing assembly 12 may be assembled by, for example, inserting sleeve 20 along bearing centerline 108 in the direction of arrow 110. The sleeve 20 is fitted over shaft 18. Next the snap ring 77 may be either compressed to fit into first groove 79 of collar 30 or expanded to fit into second groove 81 of inner race 14. The snap ring 77 is then either compressed to fit into first groove 79 of collar 30 or expanded to fit into second groove 81 of inner race 14. Next the collar 30 is threaded into the sleeve. Then the fastener 100 is threaded to the collar 30. Then the collar 30 is rotated onto the sleeve 20 and the fastener 100 is rotated to secure the collar 30 to the sleeve 20. It should be appreciated that other orders of assembly may be used.

Referring again to FIG. 5, the collar 30, sleeve 20 and inner race 14 are shown in greater detail. As shown, the sleeve 20 engages the shaft 18 at a first zone 112 under the bearing 32 under the tapered portion 25 of the sleeve and at a second zone 114 under the collar 30.

By compressing the sleeve 20 at two separate zones at two separate times an improved securing of the shaft 18 is believed to be possible. This improved securing should limit fretting and wear between the shaft and the sleeve and between the sleeve and the inner race.

Further the fastener 100 and the collar 30 may be used to separate the sleeve from the shaft when repair, disassembly or replacement is desired. Further, limited fretting and wear between the shaft and the sleeve and between the sleeve and the inner race should make such separation less difficult.

According to another embodiment of the invention, a method 300 for securing a shaft to a bearing is provided. The method 300 may include step 310 of providing a bearing including an inner ring having a bore thereof and step 312 of providing a sleeve having an internal periphery adapted for cooperation with the shaft and an external periphery adapted for cooperation with the bore of said inner ring. The method 300 may also include step 314 of urging the sleeve against the shaft and the inner ring and step 316 of providing a collar adapted for cooperation with the inner ring; and step 318 of urging the collar against at least one of the shaft and the inner ring.

The method 300 may be provided wherein the step 314 of urging the sleeve against the shaft and the inner ring is preformed prior to the step 316 of urging the collar against at least one of the shaft and the inner ring.

The method 300 may be provided wherein the step 310 of providing a bearing including an inner ring having a bore includes providing a bearing including an inner ring having a bore with a generally tapered periphery and may be provided wherein the step 312 of providing a sleeve having an internal periphery adapted for cooperation with the shaft and an external periphery adapted for cooperation with the bore of said inner ring includes providing a sleeve having a generally cylindrical internal periphery adapted for cooperation with the shaft and a generally tapered external periphery adapted for cooperation with the bore of said inner ring.

The method 300 may be provided wherein the step 318 of urging the collar against at least one of the shaft and the inner ring includes moving the collar relative to the sleeve to urge said sleeve against the shaft.

The method 300 may be provided wherein the step 316 of providing the collar includes providing the collar with internal threads, wherein the step 312 of providing the sleeve includes providing the sleeve with external threads that mate with the internal threads of said collar, and wherein the step 318 of urging the collar against at least one of the shaft and the inner ring includes rotating the collar relative to the sleeve to urge the sleeve axially with respect to the inner ring.

The method 300 may be provided wherein the step 318 of conforming the collar from a first condition to a second condition includes providing the collar with a radial slit therethrough and collapsing the collar at the slit.

The methods, systems, and apparatus described herein facilitate efficient and economical locking of a bearing to a shaft. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing a locking device to secure a bearing to a shaft. Furthermore, the exemplary methods system and apparatus achieve increased efficiency while reducing or eliminating an increase of the length of the machine. The methods, system and apparatus described herein may be used in any suitable application. However, they are particularly suited for power transmission applications.

Exemplary embodiments of the bearing lock are described above in detail. The bearing lock and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bearing lock for use with a bearing assembly including an inner race having a bore with a generally tapered periphery, the bearing assembly adapted for supporting a shaft, said bearing lock, comprising:
   a sleeve having a generally cylindrical internal periphery adapted for cooperation with the shaft and a generally tapered external periphery adapted for cooperation with the bore of the inner race, said sleeve being adapted to being conformed from a first condition in which the generally cylindrical internal periphery defines a first diameter to a second condition in which the generally cylindrical internal periphery defines a second diameter having substantially different than the first diameter;
   a collar adapted for cooperation with said sleeve for urging said sleeve from the first condition to the second condition, wherein said collar defines an interior periphery thereof, said collar adapted to being conformed from a first condition in which the generally cylindrical internal periphery defines a first diameter to a second condition in which the generally cylindrical internal periphery defines a second diameter having substantially different than the first diameter; and
   a member for axially restraining said collar with respect to said inner race;
   wherein said collar defines a first groove for receiving a portion of said member; and
   wherein said inner race defines a second groove for receiving a portion of said member.

2. The bearing lock in accordance with claim 1,
   wherein a first portion of the external periphery of said sleeve defines external threads extending toward a first end face of the sleeve;
   wherein a second portion of the external periphery of said sleeve defines a surface tapered inwardly toward a second end face of the sleeve, opposed to the first end face of the sleeve; and
   wherein a third portion of the external periphery of said sleeve is positioned between the first portion of the external periphery of said sleeve and the second portion of the external periphery of said sleeve, the third portion being recessed with respect to the first portion and to the second portion.

3. The bearing lock in accordance with claim 1,
   wherein at least a portion of the internal periphery of said collar defines internal threads; and
   wherein at least a portion of the external periphery of said sleeve defines external threads, the external threads of said sleeve mating with the internal threads of said collar.

4. The bearing lock in accordance with claim 1, wherein said sleeve defines a longitudinal slit extending from the internal periphery of said sleeve to the external periphery of said sleeve, said longitudinal slit further extending from a first end of said sleeve to an opposed second end of said sleeve.

5. The bearing lock in accordance with claim 1, wherein said sleeve defines a plurality of spaced apart longitudinally extending slits extending from the internal periphery of said sleeve to the external periphery of said sleeve.

6. The bearing lock in accordance with claim 1,
   wherein the bore of said inner race has at least a portion thereof having a generally tapered shape: and
   wherein said sleeve has an external periphery having at least a portion thereof having a generally tapered shape, the tapered portion of the bore of said inner race mating with the tapered portion of the external periphery of said sleeve.

7. The bearing lock in accordance with claim 1, wherein said inner race comprises an external periphery defining a race portion adapted for cooperation with rolling elements and opposed sealing portions axially spaced from the race portion.

8. The bearing lock in accordance with claim 1, wherein said collar defines a slit extending from a first end of said collar to an opposed second end of said collar.

9. The bearing lock in accordance with claim 1,
   wherein said collar defines a first threaded opening and a second opening; and
   further comprising a fastener for cooperation with the first and second openings and adapted to urge said collar toward said sleeve.

10. The bearing lock in accordance with claim 9,
    wherein said collar defines a slit extending from a first end of said collar to an opposed second end of said collar;
    wherein a first external face of said collar and a second external face of said collar defines a slit therebetween, the slit extending from a first end of said collar to an opposed second end of said collar;
    wherein the first threaded opening extends inwardly from the first external face;
    wherein the second opening extends inwardly from the second external face; and wherein the fastener is adapted to urge the first external face against the second external face.

11. A bearing assembly for supporting a shaft, said bearing assembly comprising:
   a rolling element bearing including an inner race having a bore with a generally tapered periphery, the bearing assembly adapted for supporting the shaft;
   a sleeve having a generally cylindrical internal periphery adapted for cooperation with the shaft and a generally tapered external periphery adapted for cooperation with the bore of the inner race, said sleeve being adapted to being conformed from a first condition in which the generally cylindrical internal periphery defines a first diameter to a second condition in which the generally cylindrical internal periphery defines a second diameter having substantially different than the first diameter;
   a collar adapted for cooperation with said sleeve for urging said sleeve from the first condition to the second condition, wherein said collar defines an interior periphery thereof, said collar adapted to being conformed from a first condition in which the generally cylindrical internal periphery defines a first diameter to a second condition in which the generally cylindrical internal periphery defines a second diameter having substantially different than the first diameter; and
   a member for axially restraining said collar with respect to said inner race, wherein said collar defines a first groove for receiving a portion of said member and wherein said inner race defines a second groove for receiving a portion of said member.

12. The bearing assembly in accordance with claim 11, wherein at least a portion of the internal periphery of said collar defines internal threads; and
   wherein at least a portion of the external periphery of said sleeve defines external threads, the external threads of said sleeve mating with the internal threads of said collar.

13. The bearing assembly in accordance with claim 11, wherein said sleeve defines a longitudinal slit extending from the internal periphery of said sleeve to the external periphery of said sleeve, said longitudinal slit further extending from a first end of said sleeve to an opposed second end of said sleeve.

14. The bearing assembly in accordance with claim 11, wherein said sleeve defines a plurality of spaced apart longitudinally extending slits extending from the internal periphery of said sleeve to the external periphery of said sleeve.

15. The bearing assembly in accordance with claim 11, wherein the bore of said inner race has at least a portion thereof having a generally tapered shape: and
   wherein said sleeve has an external periphery having at least a portion thereof having a generally tapered shape, the tapered portion of the bore of said inner race mating with the tapered portion of the external periphery of said sleeve.

16. The bearing assembly in accordance with claim 11, wherein said inner race comprises an external periphery defining a race portion adapted for cooperation with rolling elements and opposed sealing portions axially spaced from the race portion.

17. The bearing assembly in accordance with claim 11, wherein said collar defines a slit extending from a first end of said collar to an opposed second end of said collar.

18. The bearing assembly in accordance with claim 11, wherein said collar defines a first threaded opening and a second opening; and
   further comprising a fastener for cooperation with the first and second openings and adapted to urge said collar toward said sleeve.

19. The bearing assembly in accordance with claim 18, wherein said collar defines a slit extending from a first end of said collar to an opposed second end of said collar;
   wherein a first external face of said collar and a second external face of said collar defines a slit therebetween, the slit extending from a first end of said collar to an opposed second end of said collar;
   wherein the first threaded opening extends inwardly from the first external face;
   wherein the second opening extends inwardly from the second external face; and
   wherein the fastener is adapted to urge the first external face against the second external face.

20. The bearing assembly in accordance with claim 11, wherein said collar is adapted to being conformed from a first condition in which the generally cylindrical internal periphery defines a first diameter to a second condition in which the generally cylindrical internal periphery defines a second diameter having substantially different than the first diameter.

* * * * *